(12) United States Patent
deVirag et al.

(10) Patent No.: US 8,029,204 B2
(45) Date of Patent: Oct. 4, 2011

(54) SPREADABLE FOOD METERED DISPENSER

(75) Inventors: Francis Kiss deVirag, Kirtland Hills, OH (US); Alexander Sterling Wise, Mentor, OH (US); Ileen Rosner, Novelty, OH (US); Jonathan Rosner, Novelty, OH (US)

(73) Assignee: Innovation Consumer Solutions, LLC, Novelty, OH (US)

( * ) Notice: Subject to any disclaimer, the term of this patent is extended or adjusted under 35 U.S.C. 154(b) by 255 days.

(21) Appl. No.: 11/847,244

(22) Filed: Aug. 29, 2007

(65) Prior Publication Data

US 2008/0121651 A1    May 29, 2008

Related U.S. Application Data

(60) Provisional application No. 60/823,857, filed on Aug. 29, 2006.

(51) Int. Cl.
*B65D 88/54*      (2006.01)

(52) U.S. Cl. ............ 401/75; 222/63; 222/326; 222/333; 222/390; 401/266

(58) Field of Classification Search .............. 222/63, 222/333, 390, 325–327; 401/175, 172, 171, 401/265
See application file for complete search history.

(56) References Cited

U.S. PATENT DOCUMENTS

| | | | | |
|---|---|---|---|---|
| 835,606 A * | 11/1906 | Frimand | ........................ | 222/390 |
| 1,877,381 A * | 9/1932 | Beaton | ........................... | 222/390 |
| 2,656,953 A * | 10/1953 | Rich | ............................. | 222/390 |
| 2,744,664 A * | 5/1956 | Paterson | ....................... | 222/326 |
| 3,774,816 A * | 11/1973 | Bratton | ......................... | 222/391 |
| 3,884,396 A * | 5/1975 | Gordon et al. | ................ | 222/327 |
| 4,114,781 A * | 9/1978 | Doyel | ........................... | 222/326 |
| 4,240,566 A * | 12/1980 | Bergman | ...................... | 222/135 |
| 4,360,332 A * | 11/1982 | Cyin | ............................... | 425/191 |
| 4,544,083 A * | 10/1985 | Schroeder | ....................... | 222/47 |
| 4,793,521 A * | 12/1988 | Steiner | .......................... | 222/156 |
| 4,921,130 A * | 5/1990 | Hollberg | .......................... | 222/46 |
| 5,052,593 A * | 10/1991 | Grome et al. | .................. | 222/333 |
| 5,484,087 A * | 1/1996 | Negrych | ........................ | 222/390 |
| 5,993,188 A * | 11/1999 | Mak | ........................... | 425/376.1 |
| 6,460,481 B1* | 10/2002 | Young | ............................. | 118/14 |
| 6,543,953 B1* | 4/2003 | Kim | ................................ | 401/75 |
| 6,619,508 B2* | 9/2003 | Balcome et al. | .............. | 222/136 |
| 6,662,969 B2* | 12/2003 | Peeler et al. | ....................... | 222/1 |
| 6,701,828 B1* | 3/2004 | Burns et al. | .................. | 99/450.2 |
| 7,325,994 B2* | 2/2008 | Liberatore | .................... | 401/266 |
| 7,467,731 B2* | 12/2008 | Shraiber | ........................ | 222/78 |

\* cited by examiner

*Primary Examiner* — Kevin P Shaver
*Assistant Examiner* — Donnell Long
(74) *Attorney, Agent, or Firm* — Turocy & Watson, LLP

(57) ABSTRACT

A dispenser for spreadable foodstuffs or spreadable non-food substances allowing for dispensing of metered amounts of foodstuffs or non-food substances and spreading without the need for additional utensils that are not part of the packaging is disclosed. Dispenser is easily refilled with replaceable cartridges and designed to keep contents away from air as contents are dispensed.

2 Claims, 3 Drawing Sheets

SPREADABLE FOOD METERED DISPENSER

TECHNICAL FIELD

The present invention generally relates to a device for dispensing food products and other spreadable non-food substances. In particular, the present invention relates to dispensing spreadable foodstuffs or other spreadable non-food substances in specific metered amounts ready for spreading.

BACKGROUND

The vast majority of packaging of spreadable foodstuffs lack any functionality to allow contents to be used directly from the packaging. The packaging for spreadable foodstuffs such as ketchup, mustard, cream cheese, peanut putter, jelly, etc. typically require a knife or other utensil not part of the food packaging to remove the foodstuff from a container and/or achieve spreading the foodstuff as desired. Even containers that allow for squeezing the foodstuff contained therein directly out of the packaging often still require a utensil not part of the food packaging to evenly spread the foodstuff. Such containers also often do not dispense foodstuffs easily as the void space of the container increases as foodstuff is consumed. Often the contents may splatter or take a significant amount of time to flow due to a large volume of air in the container. Air being introduced to the container during the products use also negatively affects product freshness.

Traditional food containers are also typically challenging for children, elderly, diasabled, or physically challenged individuals to use. Such containers also require utensils to be washed after every minor use of the product, which is a particular inconvenience during such activities as traveling, picnics, or other occasions where typical kitchen amenities are not present in addition to individuals who do not own a dishwasher.

Additionally, spreadable foodstuffs are often difficult if not impossible to measure via traditional means such as measuring cups. Very viscous foodstuffs such as peanut butter and cream cheese are difficult to measure with measuring cups since an accurate measurement may only be achieved by packing the product to remove any air left in the measuring cup. Even after an accurate measure is taken, it is extremely difficult to quantitatively transfer the measured product out from the measuring cup. A solution to accurate measurement and use of spreadable foodstuffs is particularly pertinent in restaurant settings where consistency is important. An accurate way to dispense spreadable foodstuffs is also important in home-settings for portion control and dieters.

The invention is also designed for use with a variety of non-food semi-solid or gelatinous substances. These substances include but are not limited to toothpaste, shoe polish, paints, cosmetics, thick oils, topical medications, and emollients. The typical containers for these substances are often the same and have the same limitations as those used for foodstuffs. These main limitations being the need for an additional utensils to remove and use the substance from the container, air being introduced to the containers over time as the substance is used, difficulty of use for children or individuals with physical limitations, and difficulty in measuring with measuring cups.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Rather, the sole purpose of this summary is to present some concepts of the invention in a simplified form as a prelude to the more detailed description that is presented hereinafter.

The subject invention provides for spreadable foodstuffs or non-food substances to be packaged in a container that has a means for metering foodstuffs or non-food substances and spreading in a knife-like manner without the use of any additional utensils not part of the food packaging as well as providing for a packaging of adjustable volume such that product is kept away from air during use.

One aspect of the invention relates to providing a convenient means of metering specific amounts of spreadable foodstuffs or non-food substances without the use of other utensils not part of the food packaging. Another aspect of the invention relates to providing a convenient means of use of spreadable foodstuffs or non-food substances for those traveling, picnics or other outdoor activities, or other times when traditional home amenities are not available.

Yet another aspect of the invention relates to providing a means for restaurants and caterers to dispense and use spreadable foodstuffs with greater speed. Still yet another aspect of the invention relates to providing a packaging for that keeps contents fresher once seal on package has been broken and is in use.

Another aspect of the invention relates to minimizing waste of foodstuffs or non-food substances compared to traditional food packaging. An additional object of the invention is to provide a packaging that is less disposable than traditional packaging and therefore suitable for targeted and affinity marketing in a more affective manner.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION

Figure 1:
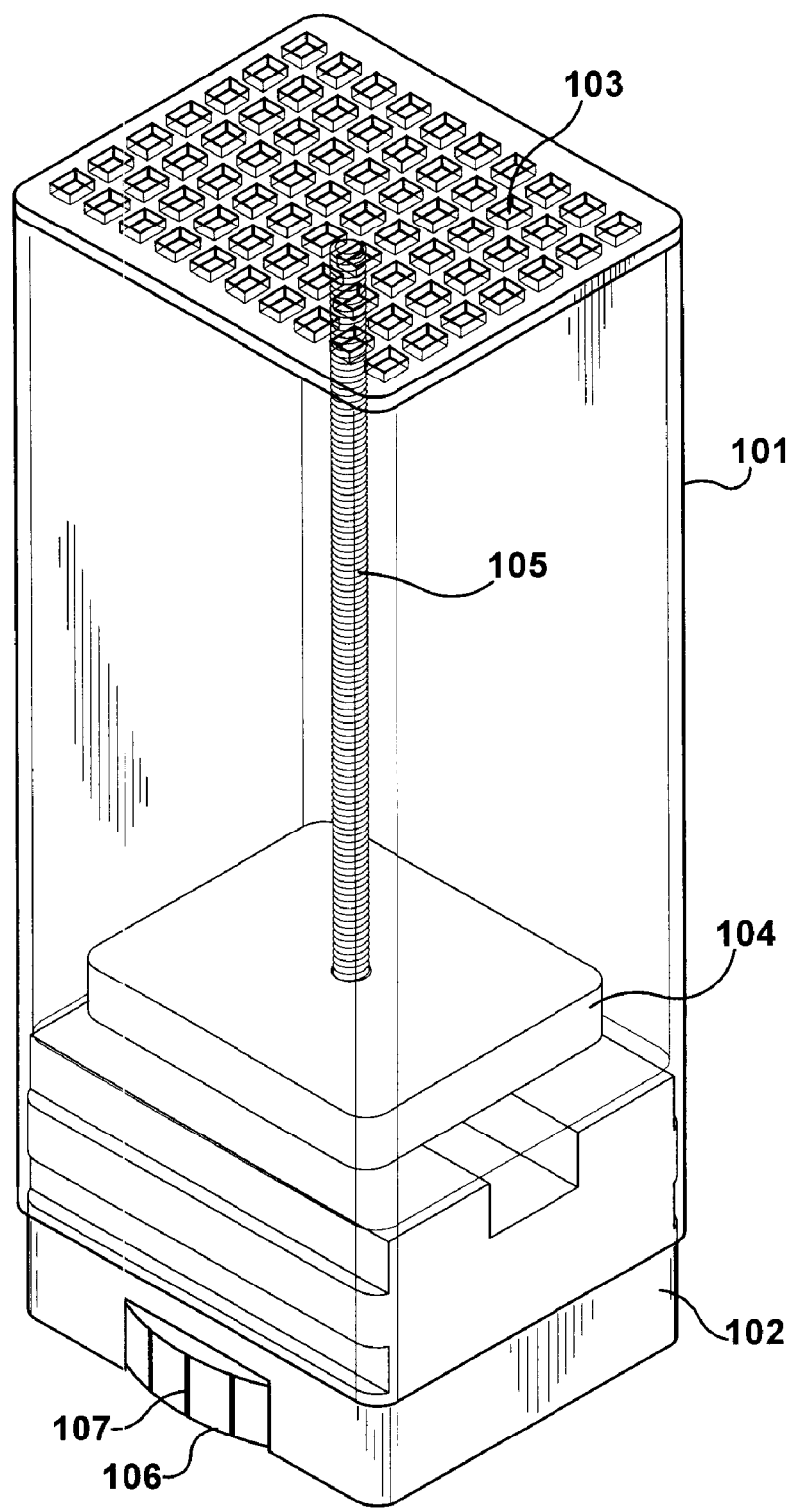
FIG. 1 is a view of the dispenser portion of the invention with body shown transparent to reveal internal components.

The food packing is composed of an approximately rectangular dispenser with a long longitudinal axis and mostly hollow. One end of the dispenser forms a base and the other end contains a grid of openings through which spreadable foodstuffs or non-food substances exit the dispenser. The base of the dispenser is detachable from the rest of the body of the dispenser. A screw-spindle is attached to the base and lies along the longitudinal axis of the dispenser when the base and body of the dispenser are attached. The base of the dispenser has a flat member forming an elevator and a mechanism is contained within the base such that the elevator member travels along the screw-spindle upon turning of a wheel on the base. The movement of the elevator member along the longitudinal axis causes the contents to move through the grid at the end of the body of the dispenser. The movement of the elevator member also causes a decrease in the volume inside the dispenser equal to the volume of contents dispensed. In this manner, air is kept out of contact with the foodstuffs or non-food substance.

The wheel is marked with graduations indicating the volume of contents dispensed upon use. The graduation marks are easily calibrated for the specific dimensions of the dispenser upon manufacturing a suitable dispenser. In an additional embodiment of the invention, an electric motor and battery is contained within the base of the dispenser such that the screw-spindle turns upon depressing a button located on the housing of the dispenser and moves the elevator member along the screw-spindle. One implementation of this embodiment portions foodstuffs or non-food substances by visual observation of graduation marks on the wheel. Optionally, the electric motor is coupled with a CPU and ROM programmed with the volume dispensed/turn of screw-spindle ratio. The amount of contents desired to be dispensed is inputted through a conventional LCD display mounted on the dispenser.

The actual foodstuffs or non-food substances are purchased by a consumer as a refill cartridge product (RCP). The dispenser described above may be sold to consumers with or without an RCP in the dispenser. In either situation, the dispenser is designed for more than one use and may be refilled using said RCPs. The dispenser may be adorned with certain affinity advertising (celebrities, sports teams, movies, etc.) and have a longer impact relative to such advertisements placed on disposable containers. The shape of the dispenser itself may be shaped to have an affinity or novelty quality (i.e., a baseball bat).

The RCP itself is formed of a body with a size and shape that can tightly or securely fit inside the dispenser when the base of the dispenser is removed. One end of the RCP has a lid that is removed by the consumer prior to placing in the dispenser. The other end of the RCP has a plunger member that lies flush against the elevator member of the dispenser when the RCP is sealed inside the dispenser. The plunger member of the RCP has a hole to accommodate the screw spindle. Upon operating the dispenser, the elevator member of the dispenser presses against and moves the plunger member of the RCP to dispense product. After insertion of a new RCP, the device is ready to dispense again.

The dispenser may be produced with different grids or tops (applicator component) attached to the dispensing end, which are suitable for different spreadable foodstuffs, spreadable non-food substances and utilities. The applicator component may either be detachable from the body of the dispenser or permanently molded into the body of the dispenser. Specifically, the size, amount/number, and pattern of openings on the dispenser top can be optimized based on the viscosity of the product being dispensed.

The dispenser of the present invention is depicted in FIG. 1. The body of the dispenser 101 along with the majority of the device is composed of rigid food grade or chemical resistant material as needed by the application. The body of the dispenser 101 can be detached from the base of the dispenser 102. The end of the dispenser opposite from the base has a series of openings 103 that allow for foodstuffs or non-food substances to exit from the dispenser. Attached to the base of the dispenser 102 are an elevator member 104 and a threaded screw-spindle 105. The elevator member 104 moves along the screw-spindle 105 upon turning a wheel 106 that in turn rotates the screw-spindle 105. Means for accomplishing turning the screw-spindle 105 upon turning wheel 106 are well known in the art. Upon manufacturing said dispenser, calibration marks 107 are added to the wheel 106 such that the amount of contents being dispensed upon turning the wheel 106 is known. In a second embodiment, the screw-spindle 105 is powered by an electric motor placed within the base of the dispenser 102. Means for combining the screw-spindle 105 with an electric motor are well known in the art. A battery may be placed inside the base and a button for activating the motor may be placed anywhere on the dispenser deemed convenient. Optionally, a CPU and ROM may be embedded in the base 102 is such a manner as to electronically control the electric motor. Data may be programmed into the CPU from a conventional LCD display mounded on the body of the dispenser 102. Methods to program the CPU to turn the screw-spindle 105 a specific amount are well-known in the art. The battery may be rechargeable from a DC power source for high use applications such as restaurants.

Figure 2:
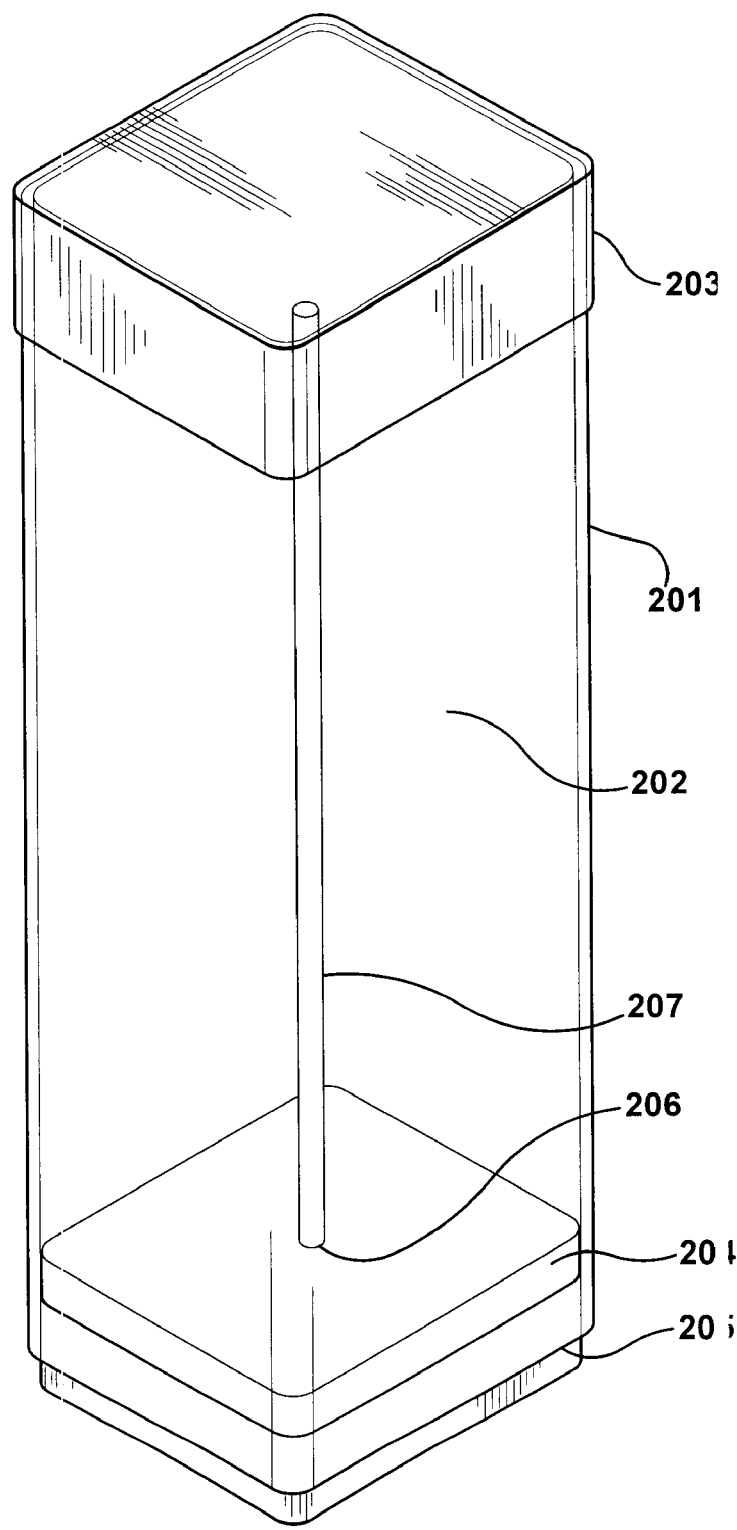
FIG. 2 is a view of the RCP portion of the invention with body shown transparent to reveal internal components.

The refill cartridge product (RCP) is depicted in FIG. 2. The body 201 and majority of the RCP is formed of food grade plastic or chemical resistant material as required. The RCP is shaped and designed to fit within the dispenser shown in FIG. 1. The RCP mostly comprises a hollow space 202 which contains the spreadable foodstuff or non-food substance. The contents are kept fresh by a lid 203 before the RCP is placed in use. The lid 203 may be replaceable such that the RCP may be taken out of the dispenser and stored before the contents are completely consumed. The RCP has a plunger member 204 and a lip 205 surrounding the bottom the RCP. The plunger member 204 and the lip 205 are design such that the elevator member of the dispenser 104 fits snuggly within the lip 205 and flush against the plunger member 204. The plunger member 204 has an opening or hole 206 at the center of the member through which the screw-spindle 105 may pass. A tube 207 may be built into the RCP along the longitudinal axis to prevent the screw spindle from contacting the foodstuff contained in the hollow space 202. The plunger member 204 fits snuggly against the body 201 of the RCP. Pressure from the elevator member 105 causes plunger member 204 to move along the longitudinal axis of the RCP while remaining in tight contact with the body 201 of the RCP.

Figure 3:
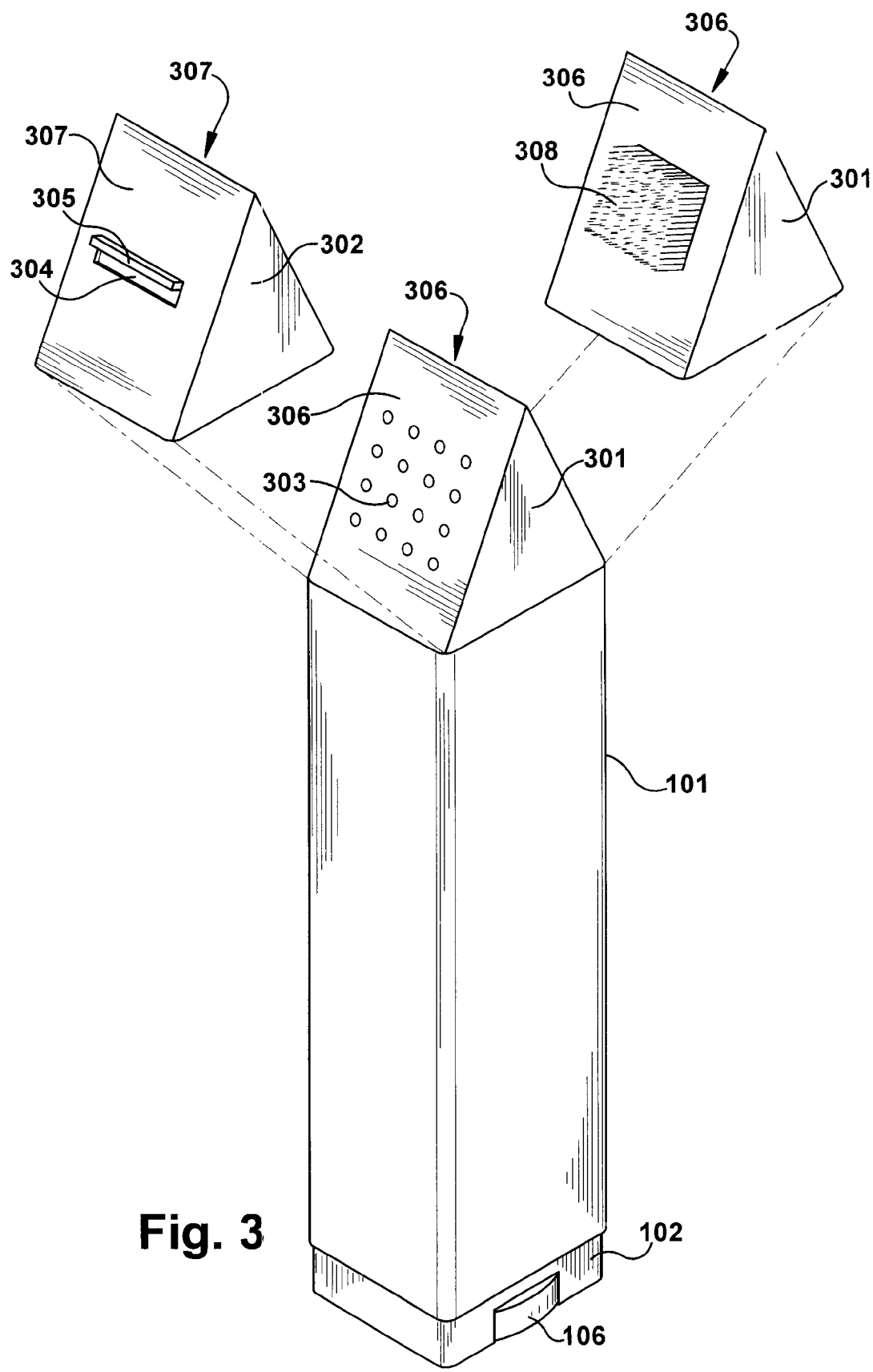
FIG. 3 is a view of the invention assembled for use with an alternate embodiment of the applicator component shown as an insert.

The dispensing end of the dispenser 103 is composed of a series of holes whose diameter and number are selected based on the consistency and viscosity of the product dispensed. An applicator component may either be detachable from the dispensing end of the dispenser 103 or molded as part of the body 101. If molded as part of the body 101, the grid at the dispensing end 103 may optionally be omitted. The dispensing component 301 or 302, as shown in FIG. 3, has a substantially raised or pyramidal shape with openings 303 or 304. The diameter of the openings is selected based on the consistency or viscosity of the product. A relatively large number of smaller holes 303 are useful for less viscose products such as jelly, ketchup or emollients. A small number or single large hole 304 is appropriate for very viscose products such as peanut butter, cream cheese or shoe polish. For viscose products, an optional lip 305 may be added to assist in detaching the dispensed product from the dispenser. The flat surface of the applicator component 306 or 307 is used in a knife-like fashion to spread the foodstuff as desired. A non-stick material is preferably used for the applicator component to aid in easy clean-up after spreading. Additionally, certain applications, such as shoe polish or paints, may benefit from built-in bristles or brushes on the container. Such bristles or brushes 308 may be conveniently placed on the flat surfaces 306 or 307 of the applicator.

While the invention has been explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A dispensing system for foodstuffs or non-food substances allowing for the direct measurement and dispensing of foodstuffs without the need for additional utensils comprising:
    a first substantially hollow dispensing container having a dispensing end and a base opposite the dispensing end, wherein the dispensing end comprises an applicator grid with one or more openings through which a foodstuff or a non-food substances can be dispensed, the applicator grid is either molded to the first container or interchangeable, and wherein the base comprises a motor and a programmable CPU;
    the first container further comprises an LCD screen through which an amount of foodstuff or non-food to be dispensed can be input;
    the first container further comprises a screw-spindle attached to the base and arranged along a longitudinal axis of the first container and an elevator member attached to the screw-spindle;
    wherein the degree of rotation of the screw-spindle correlates to a predetermined metered amount of a foodstuff or spreadable non-food substance to be dispensed, wherein the motor functions to rotate the screw spindle and wherein the programmable CPU functions to control the degree of rotation the screw spindle in accordance with the amount input on the LCD screen; and
    a second container containing a foodstuff or a non-food substance and having a shape and dimensions to fit within the first container, the second container having an opening through which the foodstuff or the nonfood substance can be dispensed, the opening of the second container is covered with a removable protective seal, and a plunger member located opposite said opening, the plunger member contains a hole to allow the screw-spindle to pass through;
    wherein rotation of the screw-spindle causes the elevator member of the first container to push against the plunger member of the second container and when the second container is fitted within said first container to dispense the foodstuff or non-food substance, the opening of the second container can be sealed be a removable and reusable lid, and the hole of the plunger member is enclosed by a tube arranged along the longitudinal axis of the second container in which the screw-spindle is inserted.

2. A dispensing system for spreadable foodstuffs or spreadable non-food substances allowing for spreading without additional utensils comprising:
    a first substantially hollow dispensing container having a dispensing end and a base opposite the dispensing end, wherein the dispensing end comprises a fixed applicator component having a pyramidal shape with at least one flat surface that provides for spreading of spreadable foodstuffs or spreadable non-food substances and one or more openings through which spreadable foodstuffs or spreadable non-food substances can be dispensed, and wherein the base comprises a motor and a programmable CPU;
    the first container further comprises an LCD screen through which an amount of foodstuff or non-food to be dispensed can be input;
    the first container further comprises a screw-spindle attached to the base and arranged along a longitudinal axis of the first container and an elevator member attached to the screw-spindle;
    wherein the degree of rotation of the screw-spindle correlates to a predetermined metered amount of a foodstuff or spreadable non-food substance to be dispensed, wherein the motor functions to rotate the screw spindle and wherein the programmable CPU functions to control the degree of rotation the screw spindle in accordance with the amount input on the LCD screen; and
    a second container containing a foodstuff or a non-food substance and having a shape and dimensions to fit within the first container, the second container having an opening through which the spreadable foodstuff or spreadable non-food substance can be dispensed, and a plunger member located opposite the opening for dispensing spreadable foodstuffs or non-food substances, the plunger member contains a hole to allow the screw-spindle to pass through;
    wherein rotation of the screw-spindle causes the elevator member of the first container to push against the plunger member of the second container and when the second container is fitted within said first container to dispense the foodstuff or non-food substance, the opening of the second container can be sealed be a removable and reusable lid, and the hole of the plunger member is enclosed by a tube arranged along the longitudinal axis of the second container in which the screw-spindle is inserted.

* * * * *